(Model.)
W. J. F. LIDDELL.
Piston Packing.
No. 238,935.          Patented March 15, 1881.
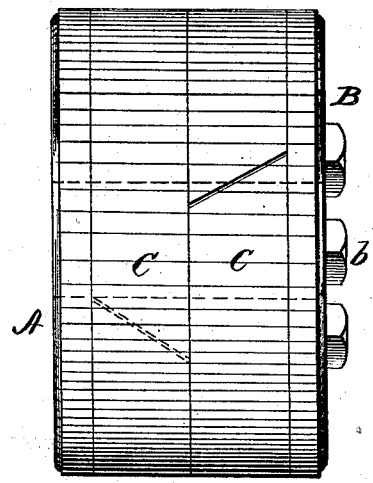
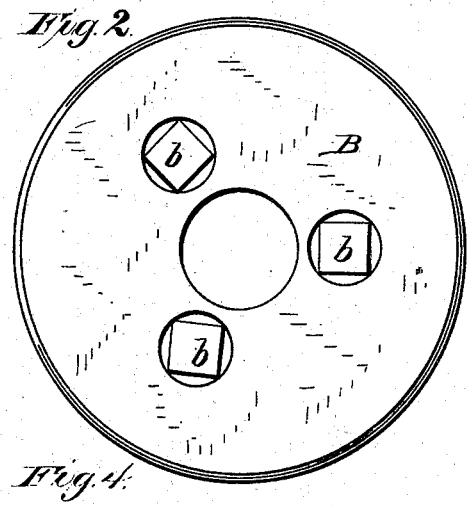
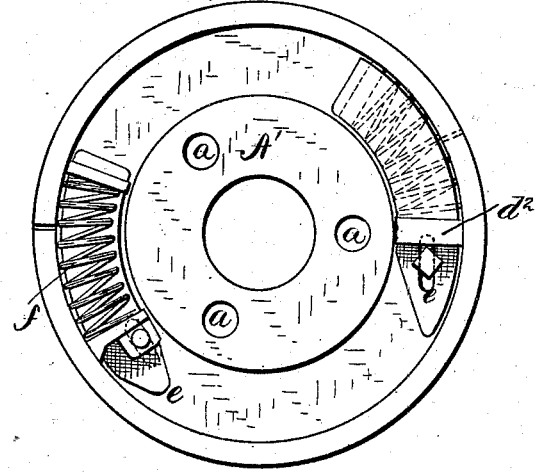
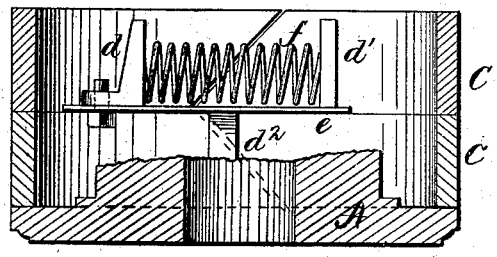
Witnesses
Franck L. Ourand
John G. Center
Inventor
W. J. F. Liddell,
by A. M. Smith & Co.
Attorneys

UNITED STATES PATENT OFFICE.

WALTER J. F. LIDDELL, OF CHARLOTTE, NORTH CAROLINA.

PISTON-PACKING.

SPECIFICATION forming part of Letters Patent No. 238,935, dated March 15, 1881.

Application filed January 13, 1881. (Model.)

*To all whom it may concern:*

Be it known that I, WALTER J. F. LIDDELL, of Charlotte, county of Mecklenburg, State of North Carolina, have invented certain new and useful Improvements in Piston-Packing, of which the following is a full, clear, and exact description, reference being had to the accompanying drawings, making part of this specification, in which—

Figure 1 is a side elevation of my improved piston. Fig. 2 is an end view of the same. Fig. 3 is a similar end view with the cap plate or disk removed. Fig. 4 represents a section through Fig. 3, with the central hub partly broken away to show the parts.

My invention relates to a novel arrangement of means for expanding the metal packing-rings; and it consists in providing said rings on opposite sides of the joint or opening in the same with inwardly-projecting lugs and with adjustable sliding plate, crossing said opening for the support of a spiral spring interposed between said lugs, and exerting its pressure upon the lugs to expand the ring, and thereby to compensate for wear, as hereinafter explained.

In the accompanying drawings, A represents the piston-head, made in the form of a disk, and having a central hub, A', provided with threaded sockets at $a$ for the reception of the screws or bolts $b$, which secure the cap plate or disk B in place, with the metal packing-rings C C', surrounding the hub A', clamped in place between the head A and plate or disk B. The rings C C' have inwardly-projecting lugs or ends $d\ d'\ d^2$ cast upon them, which serve to center the rings upon the hub A'. Two of these lugs, $d\ d'$, are arranged in close proximity with the cut or joints in the ring, one on each side thereof, as shown, and one of these has a plate, $e$, adjustably connected with it, which crosses the joint in the ring and slides by the opposite lug for the support of a spiral spring, $f$, interposed between said lugs, as shown. The tension of the spring $f$ is exerted to force the ends of the ring apart, and thus to expand the ring to compensate for wear.

The ring may be made in two parts or divided upon opposite sides, with springs crossing each joint, this form being preferred where the piston is a large one, as it tends to force the parts out evenly on opposite sides, and thus to equalize the wear; but for small pistons the single cut or joint has been found to work well in practice. Two or more of these rings are employed, arranged, where a single joint only is made in each ring, with said joints on opposite sides of the piston, and where two joints are made in each those in one will be set at right angles, or thereabout, to those in the other ring.

By the construction and arrangement described and shown a very perfect automatically-expanding packing is obtained, and one which has been found to work admirably in practice.

Having now described my invention, I claim—

The packing-ring having the inwardly-projecting lugs or ears $d\ d'$, arranged on opposite sides of the joint in said ring, the spring $f$ interposed between said lugs or ears, and the adjustable sliding plate $e$ for retaining said spring in place, substantially as described.

WALTER J. F. LIDDELL.

Witnesses:
ALEXR. MAHON,
JOHN G. CENTER.